(12) United States Patent
Tomita et al.

(10) Patent No.: US 9,560,501 B2
(45) Date of Patent: Jan. 31, 2017

(54) BASE STATION APPARATUS, COMMUNICATION CONTROLLING METHOD AND COMMUNICATION SYSTEM

(71) Applicant: FUJITSU LIMITED, Kawasaki-shi, Kanagawa (JP)

(72) Inventors: Tetsuo Tomita, Setagaya (JP); Toshiharu Kawanishi, Kawasaki (JP); Teruyoshi Watanabe, Kawasaki (JP); Mitsuhiro Tani, Kawasaki (JP); Masato Katori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 14/681,366

(22) Filed: Apr. 8, 2015

(65) Prior Publication Data

US 2015/0334694 A1 Nov. 19, 2015

(30) Foreign Application Priority Data

May 15, 2014 (JP) .................................. 2014-101723

(51) Int. Cl.
| | |
|---|---|
| *H04W 4/16* | (2009.01) |
| *H04W 72/04* | (2009.01) |
| *H04W 88/08* | (2009.01) |
| *H04W 88/02* | (2009.01) |

(52) U.S. Cl.
CPC ........... *H04W 4/16* (2013.01); *H04W 72/0406* (2013.01); *H04W 88/02* (2013.01); *H04W 88/08* (2013.01)

(58) Field of Classification Search
CPC ............. G06F 21/54; H04B 1/38; H04B 7/00; H04W 4/16; H04W 72/04; H04W 72/0406
See application file for complete search history.

(56) References Cited

U.S. PATENT DOCUMENTS

| | | | | |
|---|---|---|---|---|
| 5,960,367 A | * | 9/1999 | Kita | .......................... H04B 1/38 455/11.1 |
| 2010/0169484 A1 | * | 7/2010 | Okamoto | ................ G06F 21/54 709/225 |
| 2011/0185052 A1 | | 7/2011 | Nakahira | |

FOREIGN PATENT DOCUMENTS

| | | |
|---|---|---|
| JP | 6-28273 A | 2/1994 |
| JP | 2011-155600 A | 8/2011 |

* cited by examiner

*Primary Examiner* — Andrew Lai
*Assistant Examiner* — Leon Andrews
(74) *Attorney, Agent, or Firm* — Arent Fox LLP

(57) ABSTRACT

A base station apparatus, includes: a processor; and a memory that stores a communication controlling program to be executed by the processor, wherein the processor is operable, based on the communication controlling program, to: receive a first call connection request transmitted from a terminal apparatus; compare a pattern including values of a plurality of parameters extracted from the first call connection request with a characteristic pattern of a second call connection request based on application communication; and perform, when the pattern of the first call connection request and the characteristic pattern coincide with each other, a transmission process to a different apparatus in accordance with the first call connection request after a delay time elapses from a reception timing of the first call connection request.

20 Claims, 17 Drawing Sheets

FIG. 5

| No | PARAMETER | EXAMPLE OF PARAMETER CONTENTS |
|---|---|---|
| 1 | MESSAGE ID | |
| 2 | TERMINAL ID | |
| 3 | CONNECTION FACTOR | ·CONNECTION REQUEST FROM TERMINAL<br>·CONNECTION REQUEST FROM NW<br>·EMERGENCY CALL<br>AND SO FORTH |
| ... | | |
| n | TERMINAL MODE | ·SAVE MODE<br>·NORMAL MODE |

FIG. 6

| APPLICATION COMMUNICATION ESTIMATION TABLE | | | | |
|---|---|---|---|---|
| GENERATION TIME | CONNECTION FACTOR | CALL TYPE | TERMINAL MODE | APPLICATION COMMUNICATION |
| HH:00 | ORIGINATION | PACKET | SAVE MODE | YES |
| HH:MM | ORIGINATION | PACKET | NORMAL | NO |

FIG. 7

|  | PARAMETER GROUP OF CALL CONNECTION SIGNALS ||||
| --- | --- | --- | --- | --- |
|  | GENERATION TIME | CONNECTION FACTOR | CALL TYPE | TERMINAL MODE |
| #0 | NULL | NULL | NULL | NULL |
| #1 | NULL | NULL | NULL | NULL |
| #2 | NULL | NULL | NULL | NULL |
| ... | NULL | NULL | NULL | NULL |
| #n | NULL | NULL | NULL | NULL |

FIG. 8

| | PARAMETER GROUP OF CALL CONNECTION SIGNALS | | | |
|---|---|---|---|---|
| | GENERATION TIME | CONNECTION FACTOR | CALL TYPE | TERMINAL MODE |
| #0 | HH:00:00 | ORIGINATION | PACKET | SAVE MODE |
| #1 | NULL | NULL | NULL | NULL |
| #2 | NULL | NULL | NULL | NULL |
| ... | NULL | NULL | NULL | NULL |
| #n | NULL | NULL | NULL | NULL |

FIG. 11

| No | PARAMETER | EXAMPLE OF PARAMETER CONTENTS |
|---|---|---|
| 1 | MESSAGE ID | |
| 2 | MME SIDE CONNECTION ID | |
| 3 | eNB SIDE CONNECTION ID | |
| ... | | |
| N+1 | DATA LINE ID | |
| N+2 | QoS INFOMATION | |
| N+3 | CONNECTION DESTINATION IP ADDRESS | |
| N+4 | CONNECTION DESTINATION PORT NUMBER | |
| | | |
| | | |

FIG. 12

| CONNECTION | GENERATION TIME | CONNECTION FACTOR | CALL TYPE | TERMINAL MODE | QoS INFORMATION |
|---|---|---|---|---|---|
| #0 | HH:05 | ORIGINATION | PACKET | SAVE MODE | MEDIUM IN PRIORITY |
| #1 | HH:10 | ORIGINATION | PACKET | SAVE MODE | LOW IN PRIORITY |
| #2 | NULL | NULL | NULL | NULL | NULL |
| ... | NULL | NULL | NULL | NULL | NULL |
| #n | NULL | NULL | NULL | NULL | NULL |

FIG. 13

| GENERATION TIME | CONNECTION GENERATION NUMBER | COMBINATION DETERMINATION TABLE ENTRY No. |
|---|---|---|
| HH:01 | 0 | NULL |
| HH:02 | 0 | NULL |
| ... | 0 | NULL |
| HH:05 | 10→11 | #0 |
| ... | 0 | NULL |
| HH:10 | 20→21 | #1 |
| ... | 0 | NULL |
| HH:59 | 0 | NULL |

FIG. 14

| GENERATION TIME | CONNECTION GENERATION NUMBER | COMBINATION DETERMINATION TABLE ENTRY No. |
|---|---|---|
| HH:01 | 100 | ... |
| HH:02 | 80 | ... |
| ... | 10 | ... |
| HH:05 | 2000 | #0、... |
| ... | 10 | ... |
| HH:10 | 1500 | #1、... |
| ... | 300 | ... |
| HH:59 | 0 | NULL |

FIG. 15

| GENERATION TIME | CONNECTION FACTOR | CALL TYPE | TERMINAL MODE | QoS INFORMATION | APPLICATION COMMUNICATION |
|---|---|---|---|---|---|
| HH:00 | ORIGINATION | PACKET | SAVE MODE | LOW IN PRIORITY | YES |
| HH:MM | ORIGINATION | PACKET | NORMAL | HIGH IN PRIORITY | NO |

FIG. 16

| GENERATION TIME | CONNECTION FACTOR | CALL TYPE | TERMINAL MODE | QoS INFORMATION | APPLICATION COMMUNICATION |
|---|---|---|---|---|---|
| HH:00 | ORIGINATION | PACKET | SAVE MODE | LOW IN PRIORITY | YES |
| HH:MM | ORIGINATION | PACKET | NORMAL | HIGH IN PRIORITY | NO |
| HH:05 | ORIGINATION | PACKET | SAVE MODE | MEDIUM IN PRIORITY | YES |
| HH:10 | ORIGINATION | PACKET | SAVE MODE | LOW IN PRIORITY | YES |

BASE STATION APPARATUS, COMMUNICATION CONTROLLING METHOD AND COMMUNICATION SYSTEM

CROSS-REFERENCE TO RELATED APPLICATION

This application is based upon and claims the benefit of priority from the prior Japanese Patent Application No. 2014-101723 filed on May 15, 2014, the entire contents of which are incorporated herein by reference.

FIELD

The embodiments discussed herein are related to a base station apparatus, a communication controlling method and a communication system.

BACKGROUND

Together with the spread of the smartphone, utilization of an Internet application (for example, a social networking service (SNS), LINE (registered trademark) and so forth) through a mobile network is expanded and a utilization mode of a mobile network is varied significantly.

A related technology is disclosed in Japanese Laid-open Patent Publication No. 2011-155600 and Japanese Laid-open Patent Publication No. 06-28273.

SUMMARY

According to an aspect of the embodiments, a base station apparatus, includes: a processor; and a memory that stores a communication controlling program to be executed by the processor, wherein the processor is operable, based on the communication controlling program, to: receive a first call connection request transmitted from a terminal apparatus; compare a pattern including values of a plurality of parameters extracted from the first call connection request with a characteristic pattern of a second call connection request based on application communication; and perform, when the pattern of the first call connection request and the characteristic pattern coincide with each other, a transmission process to a different apparatus in accordance with the first call connection request after a delay time elapses from a reception timing of the first call connection request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 depicts an example of a format of a call connection request;
FIG. 6 depicts an example of a characteristic pattern table;
FIG. 7 depicts an example of a comparison target parameter retention table;
FIG. 8 depicts an example of a comparison target parameter retention table;
FIG. 11 depicts an example of a format of a wireless bearer setup request;
FIG. 12 depicts an example of a combination determination table;
FIG. 13 depicts an example of a count table;
FIG. 14 depicts an example of a count table;
FIG. 15 depicts an example of a characteristic pattern table;
FIG. 16 depicts an example of a characteristic pattern table.

DESCRIPTION OF EMBODIMENTS

In a portable telephone, communication, for example, voice communication, mail communication, Internet connection communication or the like, is generated in response to an operation by a user. Therefore, communication traffic occurs in a temporally distributed relationship as viewed from entire users.

Communication by an application incorporated in a terminal apparatus such as a smartphone (such communication may be hereinafter referred to as "application communication") tends to be started all at once because the application has a function for accessing a server in a given cycle or at given time irrespective of an operation by the user. When application communication is started, a "call connection processing procedure" is executed. In the "call connection processing procedure," a "call connection controlling signal" is transferred among a terminal apparatus such as a smartphone, a base station apparatus and a "core network apparatus." For example, the terminal apparatus transmits a "call connection request" as a "call connection controlling signal" to the "core network apparatus" through a base station. For example, in the application communication, there is a tendency that the call connection controlling signal is transmitted all at once. The traffic by the application communication may be expanded as transition from a portable telephone set to a terminal apparatus such as a smartphone advances, and a traffic amount of a mobile network may increase significantly. Together with the spread of the application communication, the mode of the traffic may transition from a time-distributed mode to another mode in which the traffic occurs all at once at a fixed time (such traffic may be hereinafter referred to as "fixed time all-at-once traffic").

For example, if call connections occur all at once, a processing load of a base station apparatus or a core network apparatus increases by burst traffic. If an amount of call connection controlling signals of a processing target exceeds a processing capacity of the base station apparatus or the core network apparatus, the call connection controlling signals may be discarded. Therefore, the communication service may be degraded. For example, if a call connection controlling signal is discarded, call connection is not performed, and a situation in which the user may not utilize a service may occur.

The base station apparatus and the communication system disclosed herein are not restricted by embodiments described below. In the embodiments described below, elements including substantially same functions or like functions are denoted by the same reference symbols and overlapping description of such elements may be omitted.

Figure 1:
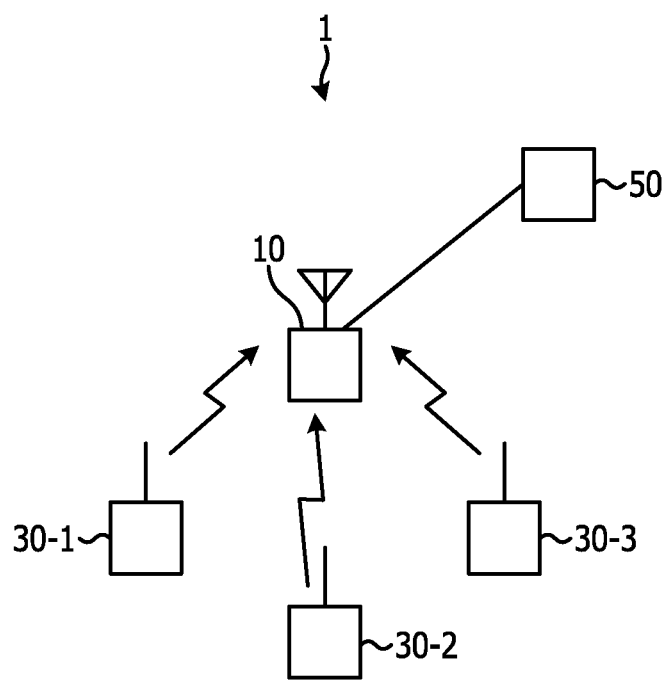
FIG. 1 depicts an example of a communication system.

FIG. 1 depicts an example of a communication system. In FIG. 1, a communication system 1 includes a base station apparatus 10, terminal apparatuses 30-1 to 30-3 and a core network apparatus 50. The core network apparatus 50 is, for example, an apparatus that performs controlling of establishment and release of a bearer, position registration and so forth and may be, for example, a mobility management entity (MME). While, in FIG. 1, the number of base station apparatus 10 and the number of terminal apparatuses 30 are one and three, respectively, the numbers are not limited to them. Where the terminal apparatuses 30-1 to 30-3 are not to be distinguished from each other, each of the terminal apparatuses may be collectively referred to as terminal apparatus 30. The terminal apparatus 30 includes at least a central processing unit (CPU) capable of executing an application, a memory capable of storing data therein and a wireless unit that performs wireless communication. The terminal apparatus 30 may be, for example, a smartphone, a next generation mobile communication terminal, a long term evolution (LTE) communication terminal, a long term evolution-advanced (LTE-A) communication terminal, a user apparatus (User Equipment, or UE), a smart meter including a wireless communication function or the like.

When the terminal apparatus 30 start communication, the terminal apparatus 30 executes a "call connection processing procedure" together with the base station apparatus 10 and the core network apparatus 50. In the "call connection processing procedure," a "call connection controlling signal" is transmitted. For example, the terminal apparatus 30 transmits a "call connection request" as the "call connection controlling signal" to the core network apparatus 50 through the base station apparatus 10. The communication performed by the terminal apparatus 30 includes "application communication" and communication which is executed in response to an operation of the user (the communication may be hereinafter referred to as "normal communication") and is different from the "application communication." Each of the terminal apparatuses 30 transmits the "call connection request" in the "call connection processing procedure" even if the communication of a starting target is the "application communication" or the "normal communication."

The base station apparatus 10 decides whether or not a pattern of values of a plurality of parameters included in each received call connection request and a "characteristic pattern" of a call connection request by the "application communication" coincide with each other. The base station apparatus 10 delays a timing at which a transmission process is performed for a call connection request which has been decided as a coincidence, for example, for a call connection request of the application communication, by a random delay value. The base station apparatus 10 transmits the call connection request after the transmission process to the core network apparatus 50.

The base station apparatus 10 transmits a call connection request which has not been decided as the coincidence, for example, a call connection request of the normal communication, to the core network apparatus 50 without delay.

The base station apparatus 10 decides whether or not a pattern of values of a plurality of parameters included in each received call connection request and a "characteristic pattern" of the call connection request by the "application communication" coincide with each other. The base station apparatus 10 delays a timing at which a transmission process is performed for a call connection request which has been decided as a coincidence, for example, for a call connection request of the application communication, by a random delay value. The base station apparatus 10 transmits the call connection request after the transmission process to the core network apparatus 50.

Even if call connection requests of the application communication are transmitted all at once from the terminal apparatuses 30-1 to 30-3, the base station apparatus 10 receiving the call connection requests distributes transmission processing timings and transmission timings to the core network apparatus 50. Therefore, burst traffic arising from the application communication may be reduced.

Figure 2:
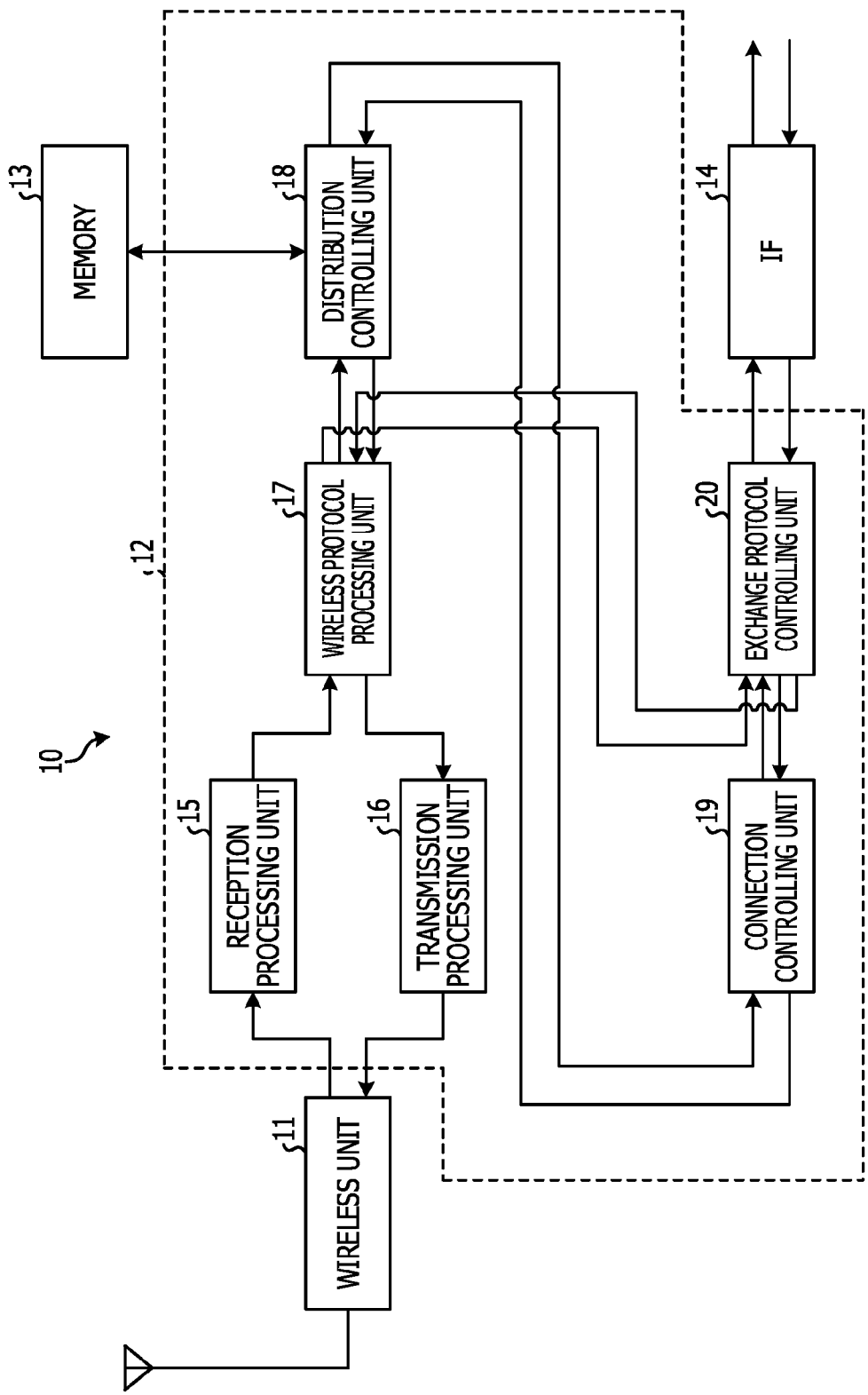
FIG. 2 depicts an example of a base station apparatus.

FIG. 2 depicts an example of a base station apparatus. The base station apparatus 10 depicted in FIG. 2 includes a wireless unit 11, a signal processing unit 12, a memory 13 and an interface (IF) 14.

The wireless unit 11 transmits and receives a wireless signal to or from the terminal apparatus 30 through an antenna. For example, the wireless unit 11 receives a wireless signal transmitted from the terminal apparatus 30 and performs a given wireless reception process (down conversion, analog-digital conversion and so forth) for a received wireless signal. The wireless unit 11 performs a given wireless transmission process (for example, digital-analog conversion, up conversion and so forth) for a transmission signal received from a transmission processing unit 16 and transmits the resulting signal through the antenna.

The signal processing unit 12 performs a transmission and reception process for a signal to be transmitted and received between the base station apparatus 10 and the terminal apparatus 30 or the core network apparatus 50. The signal processing unit 12 decides whether or not a pattern of values of a plurality of parameters included in each call connection request from the terminal apparatus 30 and a "characteristic pattern" of the call connection request by the "application communication" coincide with each other. The signal processing unit 12 delays a timing at which a transmission process is performed for a call connection request which has been decided as the coincidence, for example, for a call connection request of the application communication, by a random delay value. The signal processing unit 12 transmits the call connection request after the transmission process to the core network apparatus 50.

For example, the signal processing unit 12 includes a reception processing unit 15, the transmission processing unit 16, a wireless protocol processing unit 17, a distribution controlling unit 18, a connection controlling unit 19 and an exchange protocol controlling unit 20.

The reception processing unit 15 performs a demodulation process for a reception signal received, for example, from the wireless unit 11.

The transmission processing unit 16 performs a modulation process for a signal received, for example, from the wireless protocol processing unit 17.

The wireless protocol processing unit 17 performs termination of a wireless protocol with the terminal apparatus 30.

The distribution controlling unit 18 decides whether or not a pattern of values of a plurality of parameters included in each call connection request from the terminal apparatus 30 and a "characteristic pattern" coincide with each other. The "characteristic pattern" is recorded as an entry in a "characteristic pattern table" stored in the memory 13. The "characteristic pattern" includes a scheduled generation time, for example, a scheduled time at which a call connection request of the application communication is transmitted. The pattern of parameter values to be compared with the "characteristic pattern" may include, for example, a time at which the distribution controlling unit 18 receives the call connection request.

The distribution controlling unit 18 delays a call connection request which has been decided as the coincidence, for example, a call connection request of the application communication, by a random delay value, and outputs the delayed call connection request to the connection controlling unit 19. Therefore, timings of the transmission process for the call connection request in the connection controlling unit 19 are distributed. Also timings at which call connection requests are transmitted from the base station apparatus 10 to the core network apparatus 50 are distributed.

Figure 3:
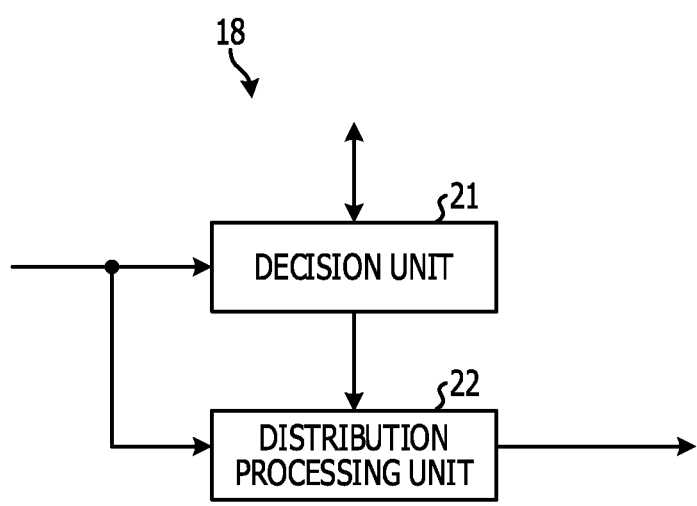
FIG. 3 depicts an example of a distribution processing unit.

FIG. 3 depicts an example of a distribution processing unit. For example, as depicted in FIG. 3, the distribution controlling unit 18 includes a decision unit 21 and a distribution processing unit 22. In the decision unit 21, the decision process described above, for example, a decision process about whether or not a pattern of values of a plurality of parameters included in each call connection request from the terminal apparatus 30 and the "characteristic pattern" coincide with each other, is performed. In the distribution processing unit 22, the delay process described above, for example, a process for delaying a call connection request of the application communication by a random delay value and then outputting the resulting call connection request to the connection controlling unit 19, is performed.

The connection controlling unit 19 depicted in FIG. 2 transmits and receives, in a "call connection processing procedure," a call connection controlling signal to and from the terminal apparatus 30 or the core network apparatus 50. For example, the connection controlling unit 19 transmits the call connection request transmitted from the terminal apparatus 30 to the core network apparatus 50 after the destination information of the call connection request is set to the address of the core network apparatus 50. For example, a header conversion process may be included in the transmission process to be performed by the connection controlling unit 19.

The exchange protocol controlling unit 20 performs termination of a protocol for an exchanger with the core network apparatus 50.

The IF 14 transmits and receives a signal to and from the core network apparatus 50 through a transmission path.

Figure 4:
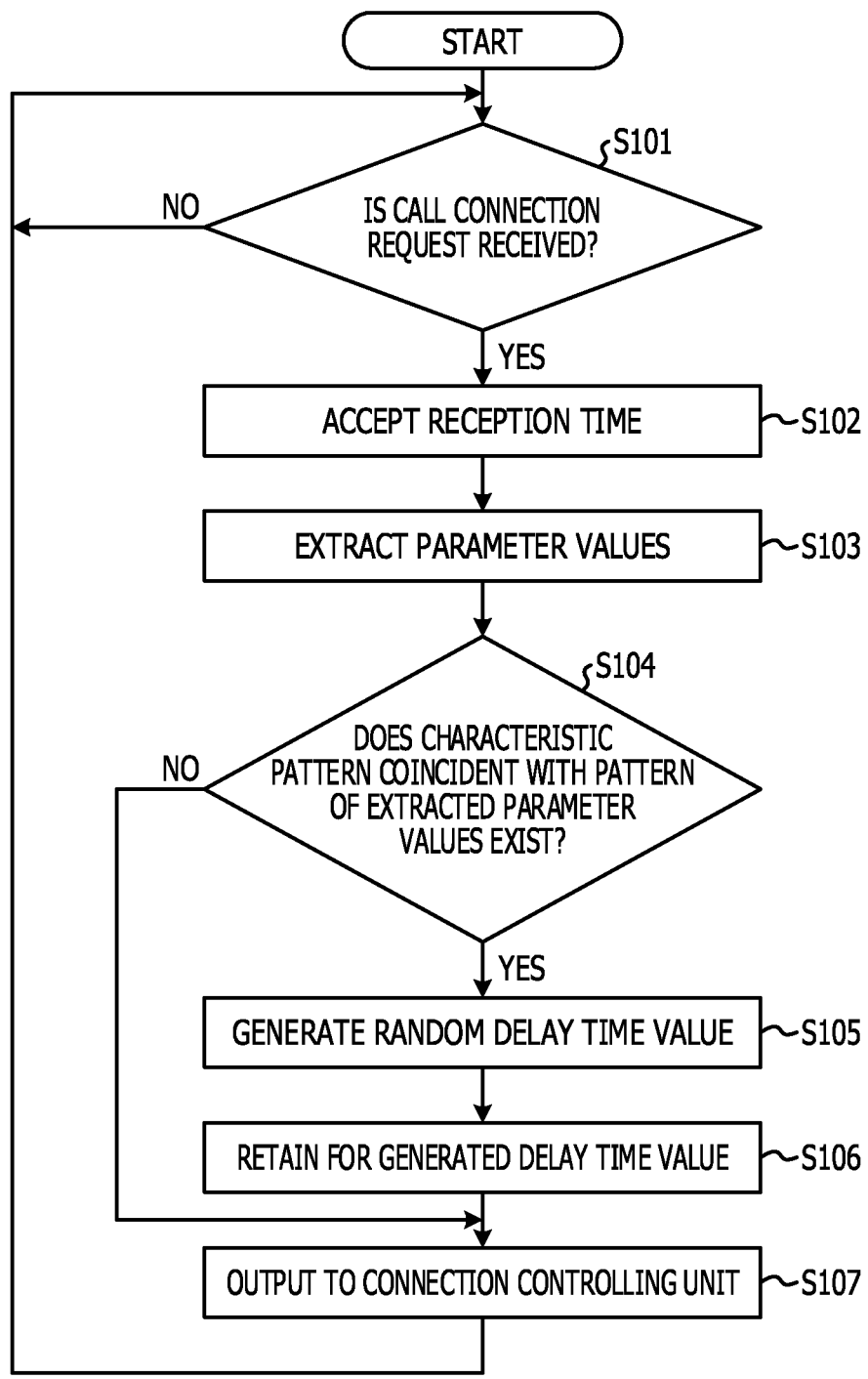
FIG. 4 depicts an example of a process by a distribution controlling unit.

FIG. 4 depicts an example of a process by a distribution controlling unit. The process depicted in FIG. 4 may be performed by the distribution controlling unit 18 depicted in FIG. 2.

The distribution controlling unit 18 waits until the distribution controlling unit 18 receives a call connection request through the wireless protocol processing unit 17 (No at operation S101). If the distribution controlling unit 18 receives a call connection request (Yes at operation S101), the distribution controlling unit 18 applies the reception time of the call connection request to the received call connection request (operation S102).

The distribution controlling unit 18 extracts parameter values from the received call connection request (operation S103). The extracted parameter values include also the reception time applied at operation S102.

FIG. 5 depicts an example of a format of a call connection request. As depicted in FIG. 5, the call connection request includes, as parameters, "MESSAGE IDENTIFIER (ID)," "TERMINAL ID," "CONNECTION FACTOR," "TERMINAL MODE" and so forth. The "MESSAGE ID" is identification information indicating a type of a message. Further, the "TERMINAL ID" is identification information of the terminal apparatus 30 that is a transmission source of a message. The "CONNECTION FACTOR" is information indicating a factor by which the call connection request is transmitted. The "TERMINAL MODE" is information indicating a mode set in the terminal apparatus 30 that has transmitted the call connection request.

In FIG. 4, the distribution controlling unit 18 decides whether or not a "characteristic pattern" coincident with a pattern of the extracted parameter values exists in the "characteristic pattern table" stored in the memory 13 (operation S104).

FIG. 6 depicts an example of a characteristic pattern table. The uppermost entry of the characteristic pattern table depicted in FIG. 6 indicates a characteristic pattern of the application communication. Since the item value of the "application communication" in the uppermost entry indicates Yes, the uppermost entry indicates the "characteristic pattern." In the "characteristic pattern" in the uppermost entry, it is indicated that the call connection request in which the item value of the generation time, for example, a parameter value, is "HH:00"; the item value of the connection factor is "origination"; the item value of the call type is "packet"; and the item value of the terminal mode is "save mode" is a call connection request of the application communication. While, in FIG. 6, also a pattern of a call connection request not of the application communication is included, a pattern of a call connection request not of the application communication may not be included.

If it is decided in FIG. 4 that a "characteristic pattern" coincident with the pattern of the extracted parameter values exists in the "characteristic pattern table" stored in the memory 13 (Yes at operation S104), the distribution controlling unit 18 generates a random delay time value (operation S105). The distribution controlling unit 18 retains the call connection request for a period of time of the generated delay time value (operation S106), and then outputs the call connection request to the connection controlling unit 19 (operation S107). If it is decided that a "characteristic pattern" coincident with the pattern of the extracted parameter values does not exist in the "characteristic pattern table" stored in the memory 13 (No at operation S104), the processing advances to operation S107. If the processing at operation S107 ends, the processing returns to operation S101. The process depicted in FIG. 4 may be ended when the power supply to the base station apparatus 10 is turned off.

The distribution controlling unit 18 may store parameter values extracted from a plurality of call connection requests successively into a "comparison target parameter retention table." The distribution controlling unit 18 may decide whether or not the patterns of the parameter values exist in the "characteristic pattern table" in order of the pattern of the parameter values stored in the "comparison target parameter retention table" in the first. FIGS. 7 and 8 depict an example of a comparison target parameter retention table. In FIG. 7, an initial state of the comparison target parameter retention table is depicted. For example, in the comparison target parameter retention table depicted in FIG. 7, all of item values indicate "NULL." In FIG. 8, a state is depicted in which one call connection request is received and the pattern of the parameter values of the call connection request is stored as an entry #0.

The base station apparatus 10 includes the decision unit 21 and the distribution processing unit 22. The decision unit 21 decides whether or not a pattern of values of a plurality of parameters extracted from each call connection request received by the reception processing unit 15 and a characteristic pattern of a call connection request based on the application communication coincide with each other. The distribution processing unit 22 receives the call connection request received by the reception processing unit 15. If it is decided by the decision unit 21 that the extracted pattern and the characteristic pattern coincide with each other, the distribution processing unit 22 delays the call connection request received from the reception processing unit 15 by a random delay value from the timing at which the call connection request is received from the reception processing unit 15, and outputs the delayed call connection request to the connection controlling unit 19.

Due to the configuration of the base station apparatus 10 described above, even if call connection requests of the application communication are transmitted at the same time from the terminal apparatuses 30-1 to 30-3, the base station apparatus 10 receiving the call connection requests distributes transmission processing timings and transmission timings to the core network apparatus 50. Therefore, burst traffic arising from the application communication may be reduced. Since the traffic is distributed at the first stage of the call connection control, burst traffic arising from the application communication may be reduced efficiently.

Figure 9:
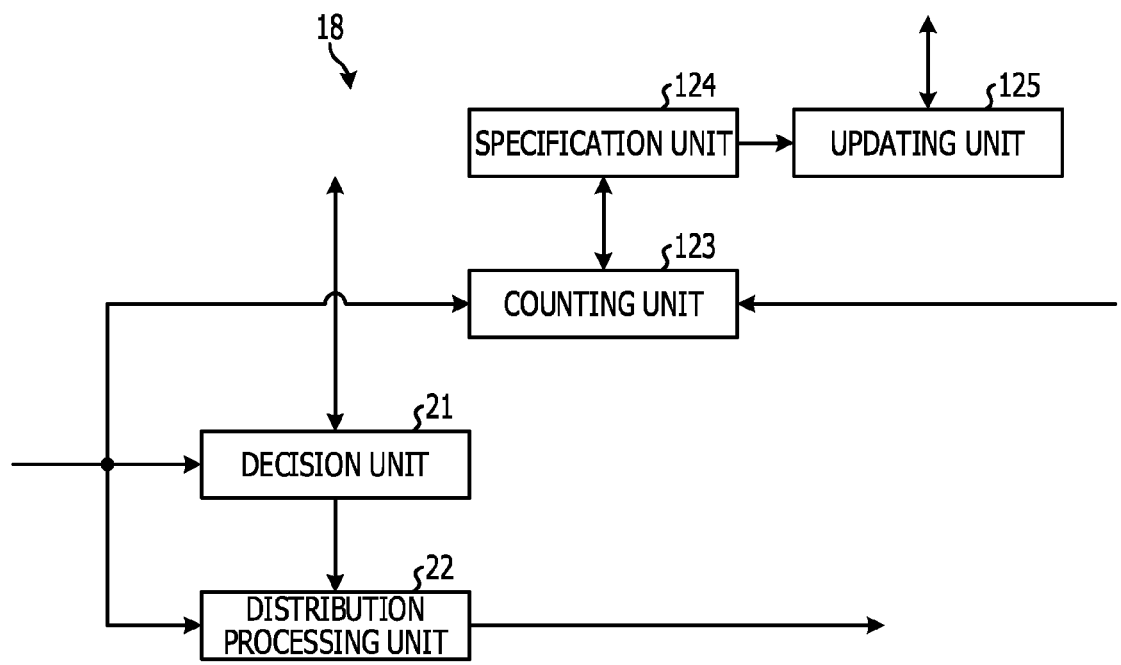
FIG. 9 depicts an example of a distribution controlling unit.

FIG. 9 depicts an example of a distribution controlling unit. The base station apparatus including the distribution controlling unit depicted in FIG. 9 may be the base station apparatus depicted in FIG. 2. The distribution controlling unit 18 depicted in FIG. 9 includes a counting unit 123, a specification unit 124 and an updating unit 125.

The counting unit 123 counts, in a "call connection processing procedure," the number of received call connection requests, for example, the execution number of the "call connection processing procedure," for each combination of a pattern of parameter values and a generation time included in a "call connection controlling signal" transmitted between the base station apparatus 10 and the terminal apparatus 30 or the core network apparatus 50.

For example, the counting unit 123 counts the execution number of the "call connection processing procedure," for example, the connection generation number, for each combination of a pattern of parameter values and a generation time included in the call connection request and a "wireless bearer setup request (E-RAB Setup Request)." For example, a value of quality of service (QoS) from a "wireless bearer setup request" is used for the counting.

The specification unit 124 specifies, as a "characteristic pattern," a combination of a pattern and a generation time in which the count value counted by the counting unit 123 within a given period is equal to or greater than a given value.

The updating unit 125 updates, for example, the characteristic pattern table depicted in FIG. 6 using the "characteristic pattern" specified by the specification unit 124.

The substance of "service data" transmitted after call connection completion may be or may not be taken into consideration. For example, the counting unit 123 may increment the connection generation number for the first time after it is confirmed that the substance of the service data transmitted after call connection completion is same as that of the "application communication."

Figure 10:
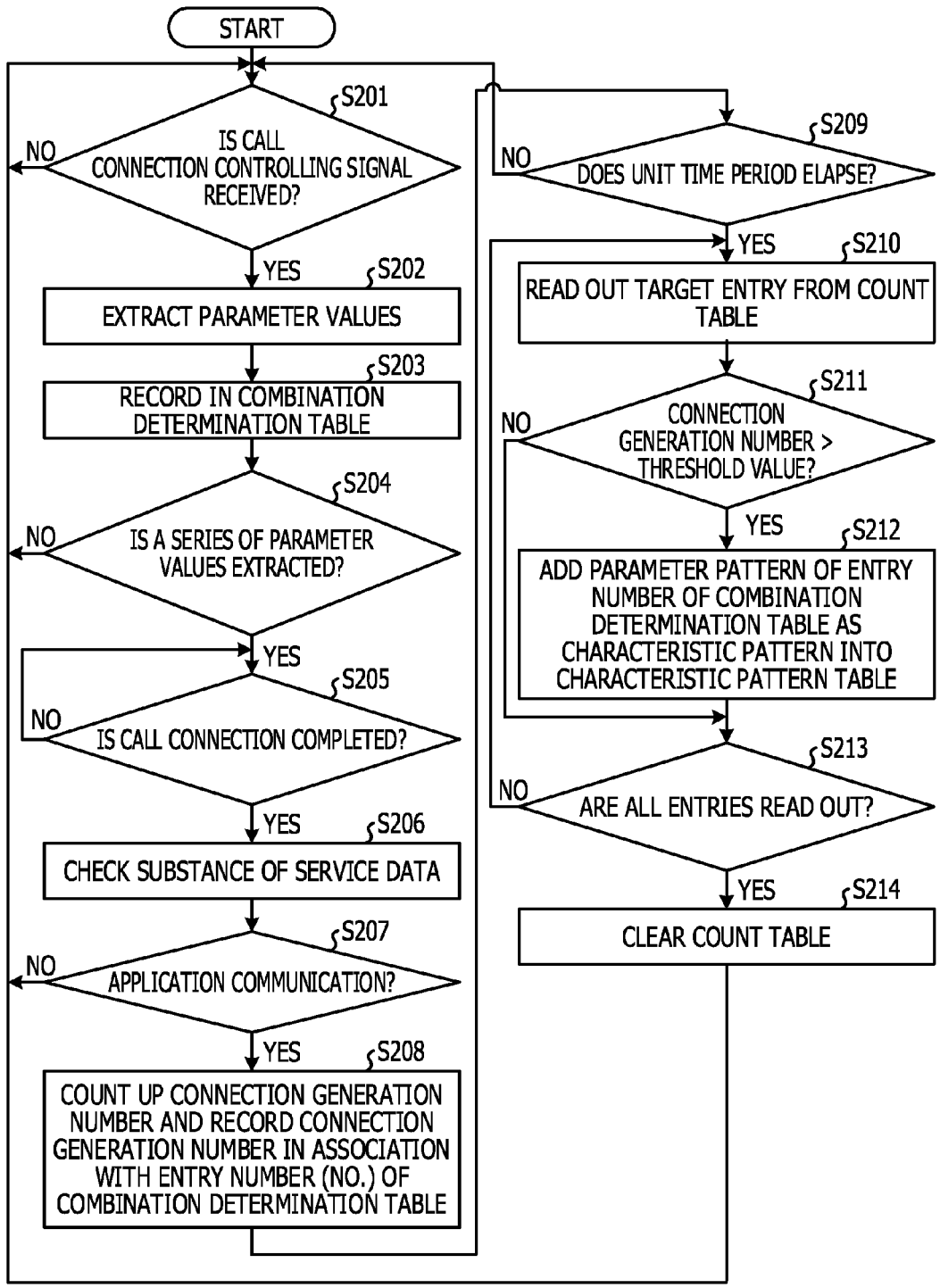
FIG. 10 depicts an example of a process by a base station apparatus.

FIG. 10 depicts an example of a process by a base station apparatus. The process depicted in FIG. 10 may be executed by the base station apparatus including the distribution controlling unit 18 depicted in FIG. 9.

The counting unit 123 waits until the counting unit 123 receives a call connection controlling signal (No at operation S201). If a call connection controlling signal is received (Yes at operation S201), the counting unit 123 extracts parameter values from the call connection controlling signal (operation S202) and records the extracted parameter values into a combination determination table (operation S203).

The counting unit 123 decides whether or not a series of parameter values, for example, a pattern of parameter values that characterize the call connection controlling signal of the application communication, is extracted (operation S204). For example, not only the parameters of the call connection request described with reference to FIGS. 1 to 9 but also parameter values included in a wireless bearer setup request are extracted and a series of parameter values is extracted.

FIG. 11 depicts an example of a format of a wireless bearer setup request. As depicted in FIG. 11, the wireless bearer setup request includes, as parameters, "MESSAGE ID," "MME SIDE CONNECTION ID," "eNB SIDE CONNECTION ID," "DATA LINE ID," "QoS INFORMATION," "CONNECTION DESTINATION IP ADDRESS," "CONNECTION DESTINATION PORT NUMBER" and so forth. The "QoS INFORMATION" is extracted, for example, by the counting unit 123 depicted in FIG. 9. FIG. 12 depicts an example of a combination determination table.

In FIG. 10, if a series of parameter values is extracted (Yes at operation S204), the counting unit 123 waits until call connection is completed (No at operation S205). If the call connection is completed (Yes at operation S205), the substance of the service data is checked (operation S206).

The counting unit 123 decides whether or not the call connection which is decided at operation S205 as that the call connection is completed corresponds to the application communication (operation S207).

If it is decided that the call connection corresponds to the application communication (Yes at operation S207), the counting unit 123 counts up the connection generation number corresponding to a generation time of the count table and records the connection generation number in association with an entry number of the combination determination table (operation S208).

FIG. 12 depicts an example of a combination determination table. FIG. 13 depicts an example of a count table. For example, if a "call connection processing procedure" corresponding to a pattern of two parameter values depicted in FIG. 12 is based on the application communication, the connection generation numbers corresponding to generation times "HH:05" and "HH:10" are counted up to "11" and "21," respectively, and also the entry numbers "#0" and "#1" of the combination determination table are recorded in association with the connection generation numbers as depicted in FIG. 13.

The specification unit 124 decides whether or not a unit time period elapses (operation S209). If the unit time period does not elapse (No at operation S209), then the processing returns to operation S201. If a series of parameter values is not extracted (No at operation S204) or if it is decided that the call connection does not correspond to the application communication (No at operation S207), the processing returns to operation S201.

If the unit time period elapses (Yes at operation S209), the specification unit 124 reads out a target entry from the count table (operation S210).

The specification unit 124 decides whether or not the connection generation number of the read out target entry is greater than a threshold value (operation S211).

If the connection generation number of the read out target entry is greater than the threshold value (Yes at operation S211), the updating unit 125 adds the pattern of parameters of the entry number of the combination determination table associated with the target entry as a characteristic pattern into the characteristic pattern table (operation S212). If the connection generation number of the read out target entry is equal to or smaller than the threshold value (No at operation S211), the processing advances to operation S213.

FIG. 14 depicts an example of a count table. For example, when the count table is in such a situation as illustrated in FIG. 14 and besides the threshold value is 1,000, the connection generation numbers of the entries corresponding to generation times "HH:05" and "HH:10" are greater than the threshold value. Therefore, parameter patterns of the entry numbers in the combination determination table associated with the two entries are added as characteristic patterns into the characteristic pattern table. FIGS. 15 and 16 depict an example of a characteristic pattern table. FIG. 15 depicts the characteristic pattern table before an addition process, and FIG. 16 depicts the characteristic pattern table after the addition process.

The processes from operation S210 to operation S212 are repeated for all entries of the count table (No at operation S213). If the processes from operation S210 to operation S212 are completed for all entries (Yes at operation S213), the counting unit 123 clears the count table (operation S214).

The counting unit 123 of the base station apparatus 10 counts, for each combination of a pattern of parameter values and a generation time included in the "call connection controlling signal," the number of received call connection requests, for example, the execution number of the "call connection processing procedure." The specification unit 124 specifies a combination of a pattern and a generation time in which the count value counted by the counting unit 123 within a given period is equal to or greater than a given value as the characteristic pattern.

In the base station apparatus 10, even if a change in environments of the application communication occurs due to appearance of a new type of application or due to change in popularity of applications to users, a "combination" of a pattern of parameter values and a generation time, which is estimated as a cause of burst traffic and is included in the call connection controlling signal, is specified autonomously.

Each of components of each of parts described hereinabove may not be configured physically as depicted in the figures. For example, all or some of the components of the parts described above may be functionally or physically disintegrated or integrated in an arbitrary unit in response to various loads, a use situation and so forth.

All or arbitrary ones of the various processing functions performed by the individual apparatus may be executed by a central processing unit (CPU) or by a microcomputer such as a micro processing unit (MPU) or a micro controller unit (MCU). All or arbitrary ones of the various processing functions may be executed by a program that is analyzed and executed by a CPU or a microcomputer such as an MPU or an MCU or by hardware that is based on wired logics.

The base station apparatus described above may be implemented, for example, by a hardware configuration.

Figure 17:
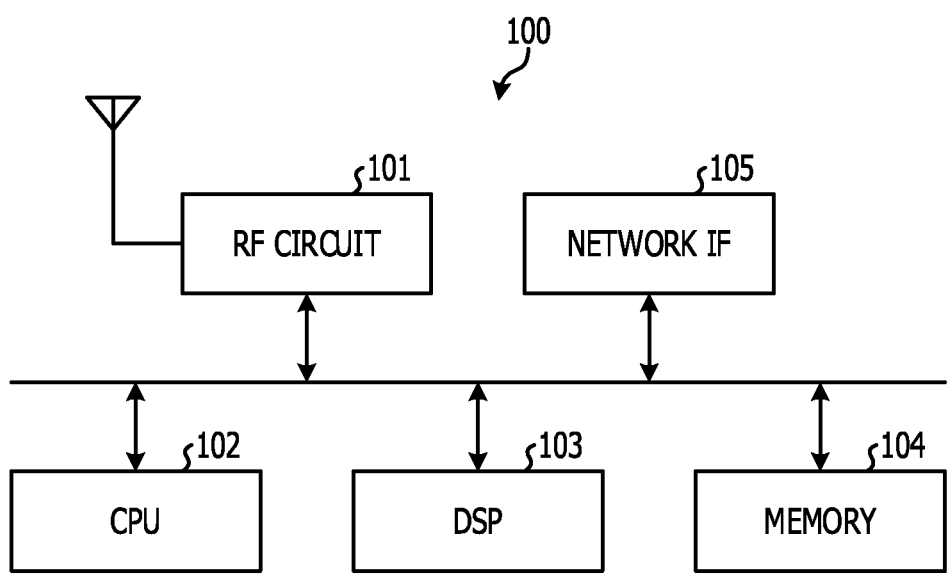
FIG. 17 depicts an example of a hardware configuration of a base station apparatus.

FIG. 17 depicts an example of a hardware configuration of a base station apparatus. As depicted in FIG. 17, the base station apparatus 100 includes a radio frequency (RF) circuit 101, a CPU 102, a digital signal processor (DSP) 103, a memory 104, and a network IF 105. As an example of the memory 104, a random access memory (RAM) such as a synchronous dynamic random access memory (SDRAM), a read only memory (ROM), a flash memory or the like may be used. A field programmable gate array (FPGA) may be adopted in place of the DSP 103.

The various processing functions performed by the base station apparatus described above may be implemented by execution of a program stored in various memories such as a nonvolatile storage medium by a processor provided in the base station apparatus. For example, a program corresponding to each of processes executed by the connection controlling unit 19 is recorded in the memory 104 and may individually be executed by the CPU 102. For example, each of the processes that are executed by the reception processing unit 15, transmission processing unit 16, wireless protocol processing unit 17, distribution controlling unit 18 and exchange protocol controlling unit 20 may be executed by the DSP 103. For example, the wireless unit 11 may be implemented by the RF circuit 101. For example, the IF 14 may be implemented by the network IF 105. The memory 13 may be implemented by the memory 104.

The various processing functions performed by the base station apparatus described above may be executed by the CPU 102 and the DSP 103 or may be executed by a single processor.

The base station apparatus 100 may be an integrated apparatus or may be configured from two separate apparatus including a wireless apparatus and a controller. In this case, for example, the RF circuit 101 may be disposed in the wireless apparatus, and the CPU 102, DSP 103, memory 104 and network IF 105 may be disposed in the controller.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus, comprising:
a processor; and
a memory that stores a communication controlling program to be executed by the processor, wherein
the processor is configured, based on the communication controlling program, to:
receive a first call connection request transmitted from a terminal apparatus;
compare a pattern including values of a plurality of parameters extracted from the first call connection request with a characteristic pattern of a second call connection request; and
perform, when the pattern of the first call connection request and the characteristic pattern coincide with each other, a transmission process to a different apparatus in accordance with the first call connection request after a delay time elapses from a reception timing of the first call connection request.

2. The base station apparatus according to claim 1, wherein the second call connection request is based on application communication.

3. The base station apparatus according to claim 1, wherein the processor sets the delay time at random.

4. The base station apparatus according to claim 1, wherein the characteristic pattern is recorded as an entry in a characteristic pattern table stored in the memory.

5. The base station apparatus according to claim 1, wherein the characteristic pattern includes a scheduled time at which a corresponding first call connection request is transmitted to the different apparatus.

6. The base station apparatus according to claim 1, wherein the processor:
receives a plurality of first call connection requests including the first call connection request from a plurality of terminal apparatuses including the terminal apparatus;
counts a number of the first call connection requests for each of patterns of the plurality of first call connection requests; and
specifies the pattern having the number of the call connection requests counted within a given period is equal to or greater than a given value as the characteristic pattern.

7. The base station apparatus according to claim 1, wherein the processor decides whether or not the plurality of parameters are extracted so as to correspond to parameters of the characteristic pattern.

8. A communication controlling method, comprising:
receiving a first call connection request transmitted from a terminal apparatus;
extracting, from the first call connection request, first parameters corresponding to second parameters included in a characteristic pattern of a second call connection request;
detecting, by a processor, whether or not a pattern including values of the first parameters coincides with the characteristic pattern; and
performing, when the pattern and the characteristic pattern coincide with each other, a transmission process to a different apparatus in accordance with the first call connection request after a delay time elapses from a reception timing of the call connection request that includes the coincident pattern.

9. The communication controlling method according to claim 8, wherein the second call connection request is based on application communication.

10. The communication controlling method according to claim 8, wherein the delay time is set at random.

11. The communication controlling method according to claim 8, wherein the characteristic pattern is recorded as an entry in a characteristic pattern table stored in the memory.

12. The communication controlling method according to claim 8, wherein the characteristic pattern includes a scheduled time at which a corresponding first call connection request is transmitted to the different apparatus.

13. The communication controlling method according to claim 8, further comprising:
receiving a plurality of first call connection requests including the first call connection request from a plurality of terminal apparatuses including the terminal apparatus;
counting a number of the first call connection requests for each of patterns of the plurality of first call connection requests; and
specifying the pattern having the number of the call connection requests counted within a given period is equal to or greater than a given value as the characteristic pattern.

14. A communication system, comprising
a base station configured to be controlled based on a communication controlling program and perform transmission and reception to and from a plurality of terminal apparatuses and a network apparatus, wherein
the base station is configured to:
receive a plurality of first call connection requests transmitted from the plurality of terminal apparatuses;
extract a pattern including values of a plurality of parameters from each of the plurality of first call connection requests,
compare the pattern and a characteristic pattern of a second call connection request based on application communication; and
perform, when the pattern and the characteristic pattern coincide with each other, a transmission process to the network apparatus in accordance with a first call connection request after a delay time elapses from a reception timing of the first call connection request including a coincident pattern.

15. The communication system according to claim 14, wherein the second call connection request is based on application communication.

16. The communication system according to claim 14, wherein the base station sets the delay time at random.

17. The communication system according to claim 14, wherein the characteristic pattern is recorded as an entry in a characteristic pattern table stored in the memory.

18. The communication system according to claim 14, wherein the characteristic pattern includes a scheduled time at which a corresponding first call connection request is transmitted to the different apparatus.

19. The communication system according to claim 14, wherein the base station:
receives a plurality of first call connection requests including the first call connection request from a plurality of terminal apparatuses including the terminal apparatus;
counts a number of the first call connection requests for each of patterns of the plurality of first call connection requests; and
specifies the pattern having the number of the call connection requests counted within a given period is equal to or greater than a given value as the characteristic pattern.

20. The communication system according to claim 14, wherein the base station decides whether or not the plurality of parameters are extracted so as to correspond to parameters of the characteristic pattern.

* * * * *